Oct. 30, 1928.
S. N. HURT
1,689,725
INDICATING DEVICE
Filed Sept. 28, 1922
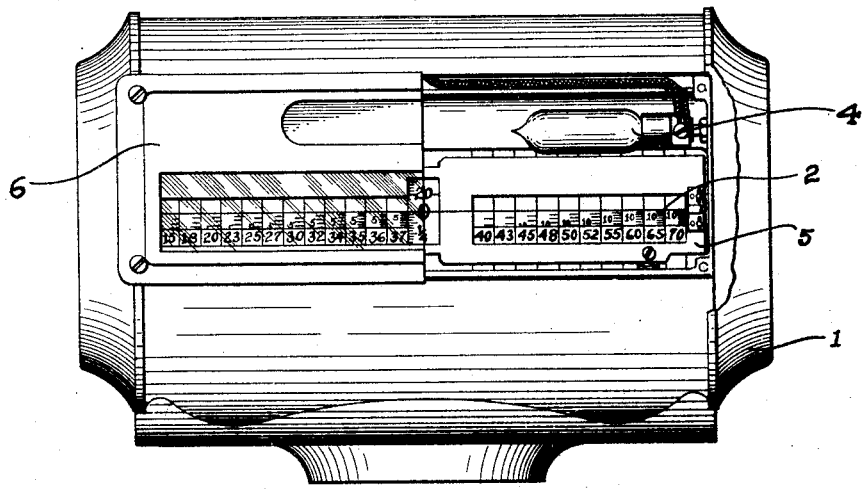
Fig. I.
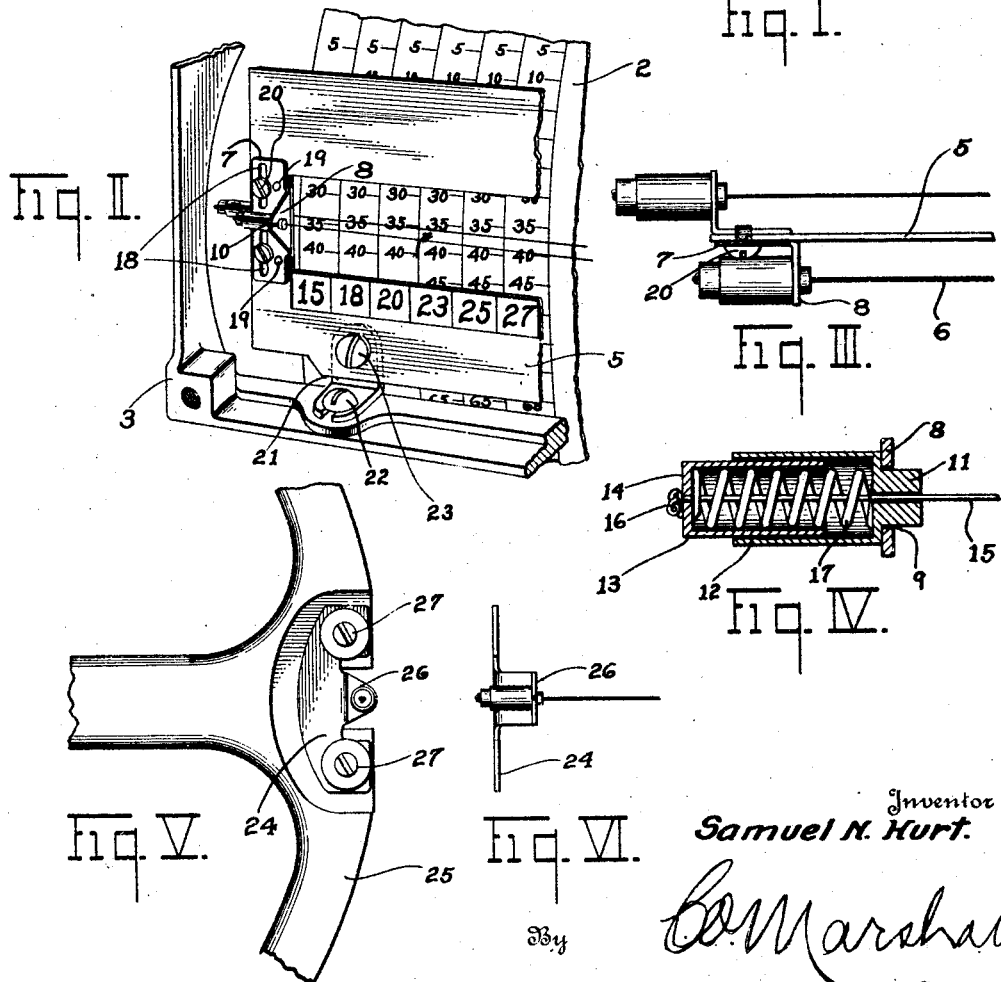
Inventor
Samuel N. Hurt.
By C. C. Marshall
Attorney Patented Oct. 30, 1928.

1,689,725

UNITED STATES PATENT OFFICE.

SAMUEL N. HURT, OF TOLEDO, OHIO, ASSIGNOR TO TOLEDO SCALE COMPANY, OF TOLEDO, OHIO, A CORPORATION OF NEW JERSEY.

INDICATING DEVICE.

Application filed September 28, 1922. Serial No. 591,025.

This invention relates to indicating devices, and particularly to indicating devices for weighing scales, and one of its principal objects is the provision of a reliable straight-line index for co-operation with computing charts.

Index lines have heretofore usually been formed of soft copper wire. Wire for this use must be absolutely straight, with no tendency to coil. It is very difficult to handle straight lengths of soft wire without bending or kinking, and when a length has once been bent the labor of straightening it usually costs more than the length of wire is worth, so that a great deal of waste always occurs in placing indicating lines of this kind in scales. It is an object of my invention to provide a mounting for indicating lines which will make it possible to use lines of braided silk or other material which is sufficiently flexible, be free from liability of kinking, and which at the same time is so light that when slightly stretched, its catenary is substantially a straight line, even when it is stretched horizontally.

Another object of the invention is the provision of a device of this kind, most of the parts of which are capable of being made by automatic screw machine and punch press operations.

Another object is the provision of a device of this kind in which the parts are so constructed and arranged that they may be quickly and easily assembled by unskilled labor.

Another object is the provision of a device of this class in which the indices are readily capable of adjustment relative to each other and to the chart with which they co-operate.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevation of the chart housing of a scale of the cylinder type, parts being removed to show the application of one form of my invention;

Figure II is an enlarged fragmentary perspective view showing the application of the device in greater detail;

Figure III is a plan view on a still larger scale showing a pair of line mountings attached to the price range plate;

Figure IV is a sectional view on a still further enlarged scale showing the line mounting assembly;

Figure V is a fragmentary side elevational view showing the form of my device adapted for use upon the rear side of the chart housing; and Figure VI is a rear elevational view of the form shown in Figure V.

Referring to the drawings in detail, the housing 1 within which the movable chart 2 is rotatably mounted is provided with a frame 3 which may, if desired, carry electric lighting apparatus and which supports a price range plate 5 and a front cover plate 6. It is usual to attach the index line to the frame of the chart housing 1, and the mounting of my invention may be attached to the frame if so desired. I prefer, however, to attach it to the price range plate, for the reason that it may be preliminarily assembled so that the price range plate, the index line, and its mountings come as a unit to the workman who assembles the scale. The mounting for each end of the index line 6 consists of a clip 7 having a substantially triangular upturned ear 8 through which is a hole 9, a kerf 10 being cut into the hole 9 from the edge of the ear 8.

Received in the hole 9 is a boss 11 formed upon the end of a hollow cylindrical member 12, the opposite end of which is open, and telescoped within the open end of the member 12 is a second cylindrical member 13, the outer end of the member 13 being closed by a wall 14. An index line 15 passes through aligned bores in the boss 11 and the wall 14, the end of the line which projects through the wall 14 being knotted, as at 16, to prevent the line from being withdrawn. An expansive spring 17 is interposed between the boss 11 and the wall 14. The body of the clip 7 is provided with a pair of vertically-extending slots 18 and a pair of threaded openings 19. It may be fastened to the price range plate 5 by means of screws 20 which pass through the slots 18 and are threaded into the price range plate 5 or into nuts on the rear side of the plate. Or, when, as is usually the case, two index lines are employed to avoid errors due to parallax, the screws 20 which pass through the slots 18 may be threaded into the threaded openings 19 of a reversely turned clip on the rear side of the price range plate 5, so that both clips are held in place, as shown in Figures II and III. The price range plate is secured to the frame 3 by means of brackets 21 and screws 22 and 23. The screw 23 passes through a vertically-elongated opening in the plate 5, so the rear index line may be adjusted to proper position relative to the chart by moving the price range plate 5. The front index line may then be adjusted to proper position by moving the clip 7. The index lines and their mountings may be readily removed from the clips 7 by pulling the bosses 11 out of the holes 9 against the action of the springs 17, so that the lines may be passed out of the holes 9 through the kerfs 10 and the index lines may be replaced by retracting the boss 11, passing the lines 15 through the kerfs 10, and allowing the springs 17 to snap the bosses 11 into place in the holes 9.

In the form of device shown in Figure V, the clip 24 is adapted to be attached to the end spider 25 of the chart housing frame. This form of the device may be used in the front of the housing in place of that already described, and it is particularly adapted for use on the rear side of the housing, in which no price range frame is mounted. In this form of the device the ear 26 is identical with the ear 8 of the form first described. The body of the clip 24 lies, however, in a plane parallel to the ear so as to be adapted to be fastened to the housing spider 25 by means of screws 27 which pass through elongated openings in the clip 24, so that each end of the index line may be adjusted vertically.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a device of the class described, in combination, a relatively movable chart and index, said index consisting of a flexible line and a line holder comprising a cylinder having one end open and its other end closed, a bracket for supporting said cylinder, a second cylinder having one end open and telescoped within the first said cylinder, the other end of the second cylinder being closed, an expansive spring interposed between the closed ends of said cylinders, said closed ends being perforated, said line being connected to said second cylinder and passing through the perforations in said closed ends.

2. In a line holding device, in combination, a clip provided with an ear, said ear having an opening therein and a kerf connecting said opening with the edge of said ear, a member having a perforated boss received in said opening, and resilient means for stretching a line through said perforated boss.

3. In a line holding device, in combination, a clip provided with an ear, said ear having an opening therein, a cylinder having one end open and its other end closed, a second cylinder having one end open and telescoped within the first said cylinder, the other end of the second cylinder being closed, and an expansive spring interposed between the closed ends of said cylinders, said closed ends being perforated to permit a line to be passed therethrough, the closed end of the first said cylinder having a boss engaged within the opening in said ear.

4. In a device of the class described, in combination, a clip having a body portion and an ear, the body portion of said clip being provided with an elongated slot adapted to receive a screw whereby said clip may be fixed in adjusted position, said ear having an opening and a kerf connecting said opening with the edge of said ear, a member having a perforated boss received in said opening, and resilient means for stretching a line through said perforated boss.

5. In a device of the class described, in combination, a supporting plate, a pair of identical clips, each of said clips comprising a body portion and an ear, said body portions being provided with slots and threaded openings, the threaded openings of said clips being adapted each to register with a slot of the other clip when one of said clips is reversed relatively to the other, and means for connecting index lines to said ears.

SAMUEL N. HURT.